(12) United States Patent
Sun et al.

(10) Patent No.: US 10,117,265 B2
(45) Date of Patent: Oct. 30, 2018

(54) RESOURCE SCHEDULING IN A WIRELESS COMMUNICATION NETWORK

(71) Applicant: Telefonaktiebolaget L M Ericsson (publ), Stockholm (SE)

(72) Inventors: Zhenglin Sun, Jiangsu (CN); Zhiyu Yang, Jiangsu (CN); Huibo Xu, Jiangsu (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 370 days.

(21) Appl. No.: 14/760,500

(22) PCT Filed: Jan. 14, 2013

(86) PCT No.: PCT/CN2013/070415
§ 371 (c)(1),
(2) Date: Jul. 13, 2015

(87) PCT Pub. No.: WO2014/107900
PCT Pub. Date: Jul. 17, 2014

(65) Prior Publication Data
US 2015/0341951 A1     Nov. 26, 2015

(51) Int. Cl.
*H04W 4/00* (2018.01)
*H04W 72/12* (2009.01)
(Continued)

(52) U.S. Cl.
CPC ....... *H04W 72/1273* (2013.01); *H04L 5/0032* (2013.01); *H04L 5/14* (2013.01); *H04W 16/10* (2013.01)

(58) Field of Classification Search
None
See application file for complete search history.

(56) References Cited

U.S. PATENT DOCUMENTS 8,204,012 B2 * 6/2012 Kim .................. H04L 5/0005
370/329
8,265,024 B2 * 9/2012 Jeon .................. H04W 72/1231
370/329

(Continued)

FOREIGN PATENT DOCUMENTS

CN     101483873 A    7/2009
CN     101982991 A    3/2011
(Continued)

OTHER PUBLICATIONS

Kwan, Raymond et al., "A Survey of Scheduling and Interference Mitigation in LTE", Journal of Electrical and Computer Engineering, vol. 2010, Jan. 2010, 1-10.
(Continued)

*Primary Examiner* — Kwang B Yao
*Assistant Examiner* — Juvena Loo
(74) *Attorney, Agent, or Firm* — Murphy, Bilak & Homiller, PLLC

(57) ABSTRACT

A method and a communication node of resource scheduling in a wireless communication network are disclosed. In the method, the network comprises N neighboring cells indexed by i which share the same frequency band, where i=0, . . . , N−1, N>=3. In the method, available frequency resources of the frequency band are divided into N subsets indexed by j, where j=0, . . . , N−1. The frequency resources in each of the subsets are not consecutive. The N subsets are allocated to the N cells in downlink subframes of a frame. The subsets allocated to each of the cells may vary among downlink subframes indexed by k, where k=0, . . . , K−1, K being the number of downlink subframes in the frame.

18 Claims, 3 Drawing Sheets

FSFR in combination with distributed dubset assignment

(51) Int. Cl.
  *H04W 16/10* (2009.01)
  *H04L 5/00* (2006.01)
  *H04L 5/14* (2006.01)

(56) References Cited

U.S. PATENT DOCUMENTS

| | | | | |
|---|---|---|---|---|
| 8,817,720 | B2* | 8/2014 | Xiao | H04L 5/0007 370/252 |
| 9,036,573 | B2* | 5/2015 | Li | H04W 72/042 370/329 |
| 2009/0059819 | A1* | 3/2009 | Choi | H04B 7/15542 370/280 |
| 2009/0140217 | A1* | 6/2009 | Wang | C03C 3/064 252/514 |
| 2009/0201867 | A1* | 8/2009 | Teo | H04L 5/0037 370/329 |
| 2010/0182972 | A1* | 7/2010 | Katayama | H04W 72/048 370/329 |
| 2010/0272218 | A1* | 10/2010 | Yeh | H04B 7/024 375/330 |
| 2010/0284482 | A1* | 11/2010 | Cudak | H04L 5/0007 375/261 |
| 2010/0311349 | A1* | 12/2010 | Koo | H04W 16/02 455/67.11 |
| 2011/0070911 | A1* | 3/2011 | Zhang | H04W 16/02 455/509 |
| 2011/0098052 | A1* | 4/2011 | Jung | H04W 72/005 455/450 |
| 2011/0194423 | A1* | 8/2011 | Cho | H04W 52/04 370/252 |
| 2011/0201341 | A1* | 8/2011 | Choudhury | H04W 72/0426 455/450 |
| 2011/0230219 | A1* | 9/2011 | Shores | H04L 5/0037 455/507 |
| 2011/0280205 | A1* | 11/2011 | Qin | H04W 72/121 370/329 |
| 2011/0310829 | A1* | 12/2011 | Ji | H04L 5/0037 370/329 |
| 2012/0088515 | A1* | 4/2012 | Choi | G01S 5/02 455/450 |
| 2012/0093105 | A1* | 4/2012 | Park | H04L 5/00 370/329 |
| 2012/0157155 | A1* | 6/2012 | Cho | H04W 52/54 455/522 |
| 2012/0178462 | A1* | 7/2012 | Kim | H04W 72/048 455/450 |
| 2013/0201942 | A1* | 8/2013 | Kim | H04W 76/045 370/329 |
| 2014/0024388 | A1* | 1/2014 | Earnshaw | H04L 5/0073 455/452.2 |
| 2014/0226575 | A1* | 8/2014 | Davydov | H04W 52/04 370/329 |
| 2014/0269456 | A1* | 9/2014 | Wang | H04B 7/2656 370/280 |

FOREIGN PATENT DOCUMENTS

| | | |
|---|---|---|
| CN | 102316584 A | 1/2012 |
| CN | 102857923 A | 1/2013 |
| EP | 2079257 A1 | 7/2009 |
| WO | 2007094628 A1 | 8/2007 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.6.0, Mar. 2009, 1-83.

3GPP, "3rd Generation Partnership Project; Technical Specification Group Radio Access Network; Evolved Universal Terrestrial Radio Access (E-UTRA); Physical layer procedures (Release 8)", 3GPP TS 36.213 V8.6.0, Mar. 2009, 1-77.

3GPP, "3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.3.0, Jun. 2010, 1-244.

Jiang, Dajie et al., "Frequency Shifted Frequency Reuse for LTE Heterogeneous Networks", Wireless Communications, Networking and Mobile Computing (WiCOM), 2011 7th International Conference, Wuhan, China Mobile Res. Inst., Beijing, China, 2011, 1-5.

* cited by examiner

RESOURCE SCHEDULING IN A WIRELESS COMMUNICATION NETWORK

TECHNICAL FIELD

The present invention generally relates to resource scheduling in a wireless communication network.

BACKGROUND

With the deployment of 3G wireless communication networks, the demand for data service has increased dramatically. To maximize spectrum efficiency, intra-frequency networking has been used in wireless networks such as LTE. Intra-frequency networking means that each neighboring cell uses the same carrier. Different User equipment (UE) in the neighboring cells, especially those at the cell edge, may receive two or more signals of the same frequency at the same time. If these co-frequency signals from various cells are strong, UEs will suffer severe interference and the quality of their communication will be deteriorated. Inter-Cell Interference Coordination (ICIC) was introduced in $3^{rd}$ Generation Partnership Project (3GPP) Release 8 to solve inter-cell intra-frequency interference.

FIG. 1 shows a schematic view of a downlink frequency band allocation scheme in a traditional ICIC solution. In the example as shown in FIG. 1, for the closest three intra-freq neighbor cells in geography, the whole bandwidth is divided into three subbands which are indicated by different patterns in FIG. 1. Each subband consists of resource block groups (RBGs) that are consecutive in frequency. The allocation of subbands is statically and permanently configured in Operations & Maintenance (O&M). Different subbands are allocated to the edge of different cells, and the whole bandwidth is reused in the centre of each cell. For the UE(s) located in cell center, the evolved NodeB (eNB) will first allocate the RBGs in the subband which belongs to other cells, but for the cell-edge UE(s), the eNB will allocate the RBGs in the corresponding subband. By allocating different subbands to the edge of different cells, UEs at the edge of one cell will not receive strong co-frequency signals from neighbouring cells.

However, in such an ICIC solution, in case that some UEs encounter frequency-selective fading and the subband allocated to their serving cell unfortunately locates on the bottom of the fading, the signal deterioration will become unavoidable.

SUMMARY

Therefore, it is an object to solve at least one of the above-mentioned problems.

According to an aspect of the invention, a method of resource scheduling in a wireless communication network is provided. In the method, the network comprises N neighbouring cells indexed by i which share the same frequency band, where i=0, ..., N−1, N>=3. In the method, available frequency resources of the frequency band are divided into N subsets indexed by j, where j=0, ..., N−1. The frequency resources in each of the subsets are not consecutive. The N subsets are allocated to the N cells in downlink subframes of a frame. The subsets allocated to each of the cells may vary among downlink subframes indexed by k, where k=0, ..., K−1, K being the number of downlink subframes in the frame.

According to another aspect of the invention, a communication node for resource scheduling in a wireless communication network is provided. The network comprises N neighbouring cells indexed by i which share the same downlink frequency band, where i=0, ..., N−1, N>=3. The communication node comprises a resource scheduler and an interface. The resource scheduler is adapted to divide the available frequency resources of the downlink frequency band into N subsets indexed by j, where j=0, ..., N−1. The frequency resources in each of the subsets are not consecutive, and allocate the N subsets to the N cells in downlink subframes of a frame. The interface is adapted to inform the N cells of the allocation.

In this way, the frequency resources allocated to each cell are not consecutive in frequency, and the cell-edge UEs can obtain frequency diversity gain. In case that they encounter frequency-selective fading, the signal deterioration will be alleviated.

BRIEF DESCRIPTION OF THE DRAWINGS

The invention will be described in detail by reference to the following drawings, in which.

DETAILED DESCRIPTION

Figure 1:
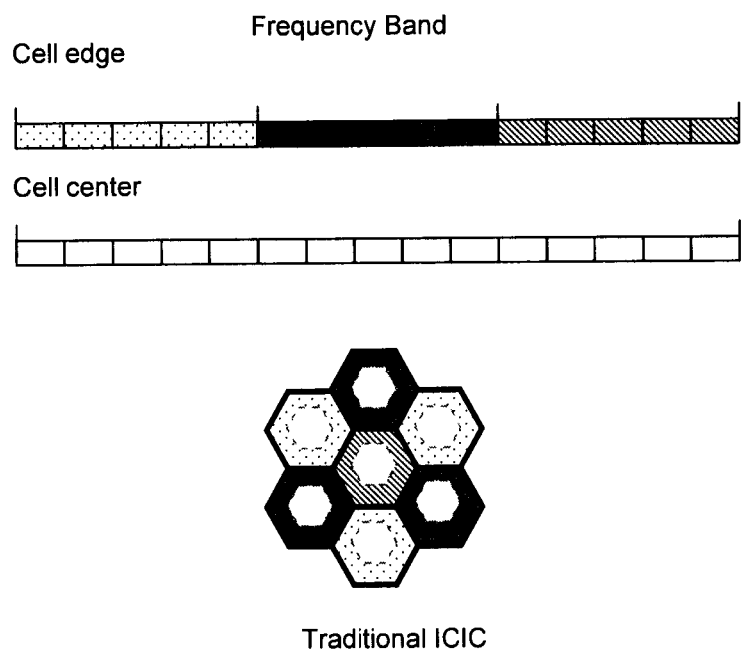
FIG. 1 shows a schematic view of a downlink frequency band allocation scheme in a traditional ICIC solution.

Embodiments of the present invention will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Although the invention is described with reference to the LTE wireless communication network in the context, the skilled in the art should understand that the invention is not limited to this, but can indeed be applied to all existing and future wireless communication networks that employ ICIC. Although specific terms in some specifications are used here, such as eNB and UE, it should be understand that the invention is not limited to those specific terms but can be applied to all similar entities.

Embodiments of the invention will be described below with reference to the drawings.

Figure 2:
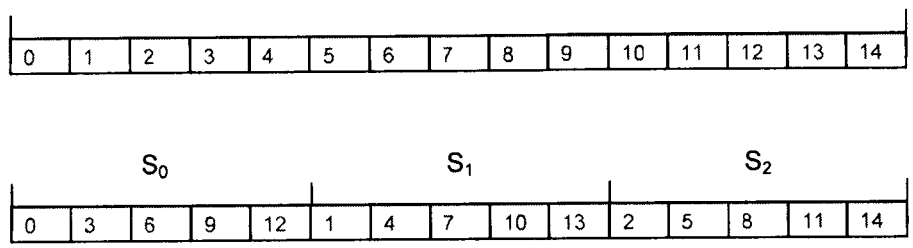
FIG. 2 shows a schematic view of a frequency band allocation scheme in accordance with an embodiment of the invention.

FIG. 2 shows a schematic view of a frequency band allocation scheme in accordance with an embodiment of the invention.

Using the same example as FIG. 1, we will only discuss the allocation of downlink frequency band to the edge of neighbouring three cells numbered as 0, 1, 2 to simplify the description. The downlink frequency band will be reused in the center of the cells. Suppose that the downlink frequency band shared by the neighbouring three cells includes 15 resource block groups (RBGs) which are numbered as 0 to 14 in sequence. One RBG may include one or more PRBs, e.g. 4 PRBs in a 20 MHz bandwidth system. Unlike the traditional ICIC solution in which the downlink frequency band are divided into three subbands consisting of consecutive RBGs (i.e. a first subband of RBGs 0, 1, . . . 4, a second subband of RBGs 5, 6, . . . 9, and a third subband of RBGs 10, 11, . . . 14), in the downlink frequency band allocation scheme according to an embodiment of the invention (hereafter referred to as "distributed subset assignment"), the downlink frequency band are divided into three subsets $S_0$, $S_1$ and $S_2$, each comprising inconsecutive (distributed) RBGs. As shown in FIG. 2, the subset $S_0$ includes RBGs 0, 3, 6, 9, and 12, subset $S_1$ includes RBGs 1, 4, 7, 10 and 13, and subset $S_2$ includes RBGs 2, 5, 8, 11 and 14. Then in subframes of a downlink frame, the cells 0 to 2 are allocated with the subsets $S_0$, $S_1$, and $S_2$. In this way, the cell-edge UEs can obtain frequency diversity gain. In case that they encounter frequency-selective fading, the signal deterioration will be alleviated since the frequency resources allocated to each cell are distributed in frequency. Note that the terminology "subset" rather than "subband" is used herein, in order to imply that the frequency resources in the subset are inconsecutive. In FIG. 2, the RBGs in each subset are evenly distributed/spaced. However, it should be noted that the distributed subset assignment is not limited to this, and the frequency diversity gain can be obtained as long as the frequency resources in each subset are not completely consecutive. For example, in an alternative embodiment, the subset $S_0$ may include RBGs 0, 2, 6, 8, and 11, subset $S_1$ may include RBGs 1, 3, 7, 9, and 13, and subset $S_2$ may include RBGs 4, 5, 10, 12 and 14. Furthermore, the minimum composition unit of a subset is not necessarily the RBG, but could be any suitable amount of frequency resources.

The above distributed subset assignment as shown in FIG. 2 is described with reference to the Frequency Division Duplexing (FDD) system, in which the downlink and uplink traffics are transmitted on separate downlink frequency band and uplink frequency band. In the FDD system, the distributed subset assignment is not applied to the uplink, that is, the traditional consecutive subband assignment is used to divide the uplink bandwidth. The above distributed subset assignment may be also applied to the Time Division Duplexing (TDD) system. In the TDD system, a frame comprises both downlink subframes and uplink frames and the uplink and downlink traffics are transmitted in the downlink subframes and uplink subframes respectively using the same frequency band. In this case, the distributed subset assignment may be used in the downlink subframes, while the traditional consecutive subband assignment is used in the uplink subframes. That is, in the downlink subframes, the available frequency band is divided into subsets each comprising inconsecutive frequency resources and the subsets are then allocated to the cells for downlink transmission in the downlink subframes, while in the uplink subframes, the available frequency band is divided into subbands each comprising consecutive frequency resources and the subbands are then allocated to the cells for uplink transmission in the uplink subframes.

Figure 3:
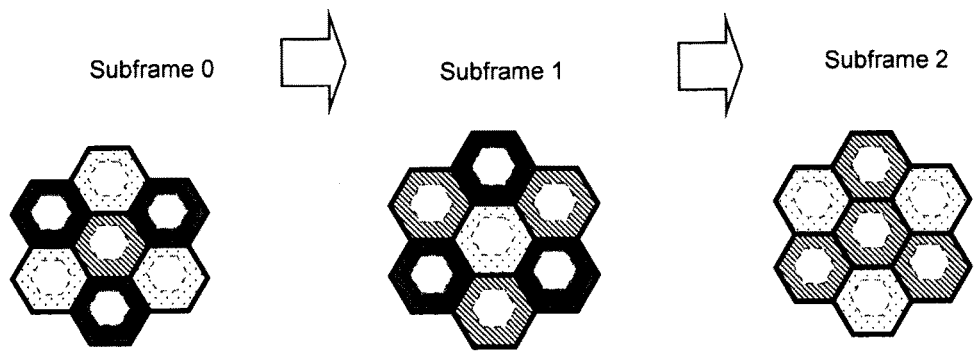
FIG. 3 shows a schematic view of another frequency band allocation scheme in accordance with an embodiment of the invention in accordance with an embodiment of the invention.

FIG. 3 shows a schematic view of another frequency band allocation scheme in accordance with an embodiment of the invention in accordance with an embodiment of the invention.

In the traditional subband assignment, the allocation scheme of the subbands to the cells is stationary in a frame. In the example as illustrated in FIG. 1, suppose that the first subband is allocated to the first cell, the second subband is allocated to the second cell and the third subband is allocated to the third cell. The allocation scheme is stationary during the frame. In the embodiment as illustrated in FIG. 3, a concept of "subframe-based subband/subset hopping" is proposed. In particular, the subsets or subband allocated to each of the cells vary among subframes in the frame. For example, a cell is allocated with the first subset in the subframe 0, but allocated with the second subset in the subframe 1 and with the third subset in the subframe 2. The same subset or subband can not be allocated to two or more cells in the same subframe. In this way, UEs in one cell will not use fixed frequency resources for long time. Such a "subframe-based subband/subset hopping" can help UEs overcome frequency-selective fading very effectively.

The subframe-based subband/subset hopping can be adopted in the ICIC solution alone, or in combination with the distributed subset assignment to further improve the capability to overcome frequency-selective fading. The subframe-based subband/subset hopping can be applied to both the FDD and TDD systems. In the FDD system, the subframe-based subband/subset hopping is applied to both the uplink and downlink. In particular, the downlink frequency band may be divided into subsets or subbands, and the subsets or subbands allocated to each of the cells in downlink may vary among subframes. The uplink frequency band may be divided into subbands, and the subbands allocated to each of the cells in uplink may vary among subframes as well. In the TDD system, a frame comprises both downlink subframes and uplink frames. In the downlink subframes, the available frequency band is divided into subsets or subbands and the subsets or subbands allocated to each of the cells may vary among downlink subframes. In the uplink subframes, the available frequency band is divided into subbands and the subbands allocated to each of the cells may vary among uplink subframes.

To simply the implementation, it is proposed in an embodiment to associate the index of subset or subband to be allocated to a cell in a subframe with the Physical Cell ID (PCI) of the cell and the index of the subframe. For example, in the above example of three neighbouring cells, the index of the subset/subband may be calculated by (PCI value of the cell+Index of the subframe) mod 3. The range of physical cell id is 0-503 in a LTE system. The PCI values of the 3 neighbouring cells are configured in advance by e.g. Service of self-Organizing Network (SON) during network planning, such that these values mod 3 are equal to 0, 1, 2 respectively. This configuration of PCI values are generally satisfied by default, otherwise the subcarriers of their downlink Cell specific Reference Signals (CRSs) would overlap (suppose all of the three cells are using two Tx antenna ports) and interfere with each other severely, which would impact channel estimation of cell-edge UEs very badly. For example, the PCI values may be 12, 13 and 14. That guarantees that the subset to be allocated to one cell in a subframe is different from that to be allocated to another cell in the same subframe, and the subsets to be allocated to the same cell vary among subframes. It should be noted that the subframe-based subband/subset hopping can be implemented by various methods other than the above specific formula. For example, the subset index can be allocated regardless of the PCI. The frequency diversity gain can be obtained as long as the frequency resources allocation to one cell is not fixed during the frame.

A schematic procedure of applying both the distributed subset assignment and subframe-based subband/subset hopping in a FDD system will be discussed hereinbelow.

The distributed subset assignment can be applied to the downlink. Suppose that there are 3 neighbouring cells which share the same downlink frequency band. The available frequency resources of the downlink frequency band are divided into 3 subsets, wherein the frequency resources in each of the subsets are not consecutive. The minimum composition unit of each subset may be RBG, and the RBGs in each subset may be evenly distributed, i.e. the indice of RBGs in each subset are spaced by 3. The three subsets are allocated to the 3 cells in (downlink) subframes of a downlink frame. If the subframe-based subset hopping is applied in the downlink, the subsets allocated to each of the cells may vary among subframes in the downlink frame. For example, the subset index to be allocated to one cell in a subframe may be calculated by (PCI value of the cell+subframe index) mod 3, where the PCI values of the 3 cells mod 3 are equal to 0, 1, 2 respectively and the subframe index indicates the index of the subframe in the downlink frame.

The distributed subset assignment can not be applied to the uplink of the FDD system. The available uplink frequency band is divided into 3 subbands, and the frequency resources in each of the subbands are consecutive. If the subframe-based subband hopping is applied in the uplink, the subbands allocated to each of the cells may vary among subframes in the uplink frame. For example, the subband index to be allocated to one cell in a subframe may be calculated by (PCI value of the cell+subframe index) mod 3, where the PCI values of the 3 cells mod 3 are equal to 0, 1, 2 respectively and the subframe index indicates the index of the subframe in the uplink frame.

A schematic procedure of applying both the distributed subset assignment and subframe-based subband/subset hopping in a TDD system will be discussed hereinbelow.

In the TDD system, a frame includes both downlink and uplink subframes or Transmission Time Intervals (TTIs). The downlink and uplink traffics use the same frequency band, but are separated by downlink and uplink subframes. The distributed subset assignment can be applied to the downlink subframes of the frame. Suppose that there are 3 neighbouring cells which share the same frequency band and the uplink-downlink subframe configurations in the three cells are static and the same (TDD configuration 1). In the downlink subframes of the frame, the available frequency resources of the frequency band are divided into 3 subsets, wherein the frequency resources in each of the subsets are not consecutive. The minimum composition unit of each subset may be RBG, and the RBGs in each subset may be evenly distributed, i.e. the indice of RBGs in each subset are spaced by 3. The three subsets are allocated to the 3 cells in downlink subframes. If the subframe-based subset hopping is applied in the downlink subframes, the subsets allocated to each of the cells may vary among the downlink subframes in the downlink frame. For example, the subset index to be allocated to one cell in a downlink subframe may be calculated by (PCI value of the cell+downlink subframe index) mod 3, where the PCI values of the 3 cells mod 3 are equal to 0, 1, 2 respectively and the downlink subframe index indicates the index of the downlink subframe in all the downlink subframes of the frame, rather than the position of the downlink subframe in all the subframes of the frame. The frame also includes special subframes of current uplink-downlink subframe configuration, and these special subframes will be taken as downlink subframes.

The distributed subset assignment can not be applied to the uplink subframes of the TDD system. In the uplink subframes, the frequency band is divided into 3 subbands, and the frequency resources in each of the subbands are consecutive. If the subframe-based subband hopping is applied in the uplink subframes, the subbands allocated to each of the cells may vary among the uplink subframes. For example, the subband index to be allocated to one cell in a uplink subframe may be calculated by (PCI value of the cell+uplink subframe index) mod 3, where the PCI values of the 3 cells mod 3 are equal to 0, 1, 2 respectively and the uplink subframe index indicates the index of the uplink subframe in all the uplink subframes of the frame.

For the TDD deployment mode 1 in which the uplink-downlink subframe configurations in the three cells are static and the same, we take TDD configuration 1 and bandwidth of 20 MHz (100 PRBs, 25 RBGs) as an example. The RBG is the minimum composition unit of one subset or subband.

In the downlink subframes, the Subset 0 comprises RBGs {0, 3, 6, 9, 12, 15, 18, 21, 24}, the Subset 1 comprises RBGs {1, 4, 7, 10, 13, 16, 19, 22}, and the Subset 2 comprises RBGs {2, 5, 8, 11, 14, 17, 20, 23}. Table 1 shows an exemplary subband/subset hopping scheme. In the TDD configuration 1, the frame comprises 10 subframes numbered as 0, 1 . . . , 9, among which the downlink subframes 0, 4, 5, 9, are indicated by "D", and the special subframes 1, 6 of current uplink-downlink subframe configuration as indicated by "S" are taken as downlink subframes as well. The subframes 2, 3, 7, 8, are uplink subframes indicated by "U". Suppose that the three neighbouring cells' PCIs are 18, 31 and 101 respectively. Table 1 lists the subset/subband indices to be allocated to each cell in each downlink subframe and each uplink subframe, which are calculated using PCI values based on the above exemplary formula. The subframe No. indicates the position of the subframe in all the subframes of the frame, while the index in downlink subframes indicates the index of the downlink subframe in all the downlink subframes of the frame, and the index in uplink subframes indicates the index of the uplink subframe in all the uplink subframes of the frame. For example, in TDD configuration 1, the subframe No. 5 is a downlink subframe, its index in the downlink subframes is 3, and the Subset 0 is allocated to the cell whose PCI is 18 during this subframe.

subframe or downlink subframe will be taken as an uplink subframe. In the TDD deployment mode 2 and mode 3, because of possible coexistence of downlink and uplink subframes at the same time, one eNB operating in its uplink subframe will receive strong interference from neighbor eNB(s) operating in its downlink subframe. If the useful signal is from cell-edge UE(s), the signal degradation and information loss will become more severe compared to the cell-center UE(s). The similar downlink performance degradation and information loss may also occur if two cell-edge UEs camping on different neighbor cells are very close to each other. Therefore, the solution proposed for the TDD deployment mode 2 and mode 3 can help cell-edge UE(s) overcome such interference and improve their performance, because with the division in frequency domain, such kind of interference will not impact cell-edge UE(s) anymore.

The above concepts of distributed subset assignment and subframe-based subband/subset hopping may be applied not only to the whole available bandwidth, but to a part of the whole available bandwidth. In an embodiment, it is proposed to use the distributed subset assignment and/or subframe-based subband/subset hopping in combination with the FSFR.

Figure 4:
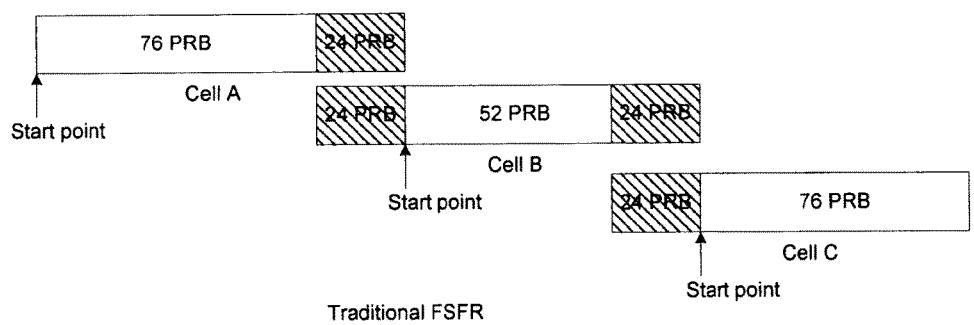
FIG. 4 shows a schematic view of the traditional Frequency Shifted Frequency Reuse (FSFR) solution.

FIG. 4 shows a schematic view of the traditional FSFR solution. FSFR is used in OFDMA/OFDM wireless systems

TABLE 1

Subband/subset hopping in TDD deployment mode 1

| PCI | | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 18 | Subframe Type | D | S | U | U | D | D | S | U | U | D |
| | Index in Downlink Subframes | 0 | 1 | | | 2 | 3 | 4 | | | 5 |
| | Index in Uplink Subframes | | | 0 | 1 | | | | 2 | 3 | |
| | (Downlink) Subset Index | 0 | 1 | | | 2 | 0 | 1 | | | 2 |
| | (Uplink) Subband Index | | | 0 | 1 | | | | 2 | 0 | |
| 31 | Subframe Type | D | S | U | U | D | D | S | U | U | D |
| | Index in Downlink Subframes | 0 | 1 | | | 2 | 3 | 4 | | | 5 |
| | Index in Uplink Subframes | | | 0 | 1 | | | | 2 | 3 | |
| | (Downlink) Subset Index | 1 | 2 | | | 0 | 1 | 2 | | | 0 |
| | (Uplink) Subband Index | | | 1 | 2 | | | | 0 | 1 | |
| 101 | Subframe Type | D | S | U | U | D | D | S | U | U | D |
| | Index in Downlink Subframes | 0 | 1 | | | 2 | 3 | 4 | | | 5 |
| | Index in Uplink Subframes | | | 0 | 1 | | | | 2 | 3 | |
| | (Downlink) Subset Index | 2 | 0 | | | 1 | 2 | 0 | | | 1 |
| | (Uplink) Subband Index | | | 2 | 0 | | | | 1 | 2 | |

In addition to the TDD deployment mode 1, there are other two kinds of neighbouring cell deployments (referred to as deployment mode 2 and mode 3). In the deployment mode 2, the uplink-downlink subframe configurations in the three cells are static but not exactly the same, and in the deployment mode 3, the uplink-downlink subframe configurations in the three cells are dynamically changed. The distributed subset assignment and subframe-based subset/subband hopping can be applied to the deployment mode 2 and mode 3 in a similar way to the deployment mode 1, except that the subframe which is configured to be an uplink subframe for at least one of the cells will be taken as an uplink subframe. For example, in the TDD deployment mode 2, due to the different uplink-downlink subframe configurations among cells, a subframe may be configured to be an uplink subframe in one cell but configured to be a downlink subframe in other two cells. In this case, such a "two-role" subframe will be taken as an uplink subframe. Similarly, in the TDD deployment mode 3, a "flexible" subframe that could be configured to be either an uplink to improve performance of the cell-edge UEs. For purpose of simplicity, a scenario that three neighbouring cells deploy FSFR will be discussed. Suppose that each of the three neighbouring cells A, B and C may use 100 PRBs. However, they only share a part (24 PRBs) of the whole bandwidth. As shown in FIG. 4, the cell A and the cell B have an overlapped zone of 24 PRBs, and the cell B and the cell C have an overlapped zone of 24 PRBs. In order to avoid interference, the overlapping zone can only be utilized by one cell at the same time, so the PRB start point of each cell has to be predefined. A shortcoming of such a traditional FSFR solution is unbalanced load for different cells. For example, cell A can utilize 100 PRBs, but cells B and C can only utilize 76 PRBs, which leads to a load difference of 24 PRBs.

Figure 5:
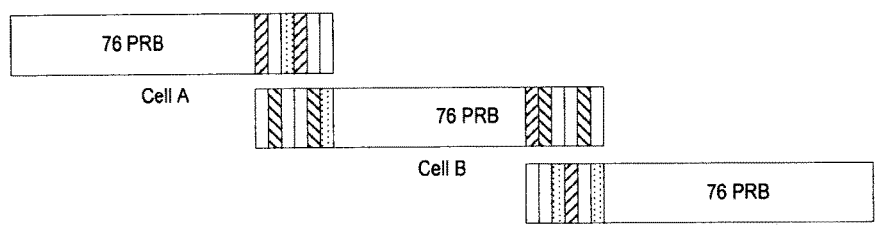
FIG. 5 shows a schematic view of the FSFR solution according to an embodiment of the invention.

FIG. 5 shows a schematic view of the FSFR solution according to an embodiment of the invention. Taking the same example of FIG. 4, the overlapping zone between cell A and cell B has 24 PRBs, i.e. 6 RBGs in all. The overlapped 6 RBGs are indexed by 0, 1, . . . , 5. Using distributed subset assignment, subset 0 comprises RBGs {0, 3}, subset 1 comprises RBGs {1, 4}, and subset 2 comprises RBGs {2, 5}. Suppose in one downlink subframe, subset 0 is allocated to cell A and subset 1 is allocated to cell B, in other words, cell A can use the $19^{th}$ and $22^{nd}$ RBGs starting from its start point, and cell B can use the $1^{st}$ and $4^{th}$ RBGs starting from its start point, to serve their individual cell-edge UEs. Similar subsets partition for the overlapping zone between Cell B and Cell C can also be implemented. The subframe-based subset hopping can be also applied so that the subset allocation scheme varies among subframes. In FIG. 5, the subsets are indicated by blocks filled with three patterns.

In the scenario of three neighbouring cells, the overlapped frequency band may belong to two or three neighbour cells. In the example as shown in FIG. 5, the overlapped frequency band may belong to two neighbor cells if the bandwidth is sufficient, i.e. the cells A and B have an overlapped zone. In this situation, the RBGs of the third subset would be wasted. In order to make full use of the whole bandwidth and avoid such waste, the RBGs of the third subset on each downlink subframe can be moved to the two subsets for neighbor cells A and B. The third subset then becomes an idle subset, as indicated by the blank block in FIG. 5. An exemplary implementation of FSFR solution is discussed hereinbelow.

To facilitate usage of RBG in overlapping zone, during frequency deployment, the size of the overlapped zone may be configured to be multiple of the RBG size according to 3GPP TS 36.213 table 7.1.6.1-1. Then the size of overlapping zone is expressed in the unit "RBG". The eNB configures measurement request of event A4 (refer to 3GPP TS 36.331, chapter 5.5.4.5) for each UE, and then from UE's measurement report which includes PCI of neighbor cell(s), the eNB can judge that the intra-freq interference mainly comes from which neighbor cell(s). The eNB can find out the overlapped zone between serving cell and major interference cell(s) and divide the overlapping zone into three subsets based on the distributed subset assignment as described above, and/or perform subframe-based subset hopping as described above. To facilitate implementation, each cell can mark the overlapped zone with a group of common "virtual" RBG indices: 0, 1, 2 . . . , and map the common virtual RBG indices to their individual corresponding real RBG indices after completion of distributed subset assignment. To further improve the frequency efficiency and avoid waste, in the scenario that two cells share the overlapped zone, the RBGs of the remaining subset on each downlink subframe can be "lent" to the two neighboring cells, i.e. moved to the other two subsets. Each cell can get its own subset index on each downlink subframe based on the above mentioned solution of distributed subset assignment for FSFR and subframe-based subset hopping. According to the PCI value in measurement report of event A4, on any downlink subframe, the serving eNB can deduce the subset index of the major interference neighbor cell so that the remaining subset, i.e. idle subset, can be known by both of the two neighboring cells as well. The virtual RBGs in the idle subset can be "lent" to the two neighboring cells in various methods. For example, if the virtual RBG index. mod 2=0, it is "lent" to the cell which has a smaller PCI, otherwise, this RBG is "lent" to the cell which has a larger PCI.

In addition to the frequency diversity gain, the combination of FSFR of distributed subset assignment and/or subframe based subset hopping leads to a more balanced load among cells. As shown in FIG. 5, cell A can utilize 76+4*3=88 PRBs, the cell B can utilize 52+4*3*2=76 PRBs and the cell C can utilize 76+4*3=88 PRBs, so the load difference between two cells decrease to 88−76=12 PRBs.

Figure 6:
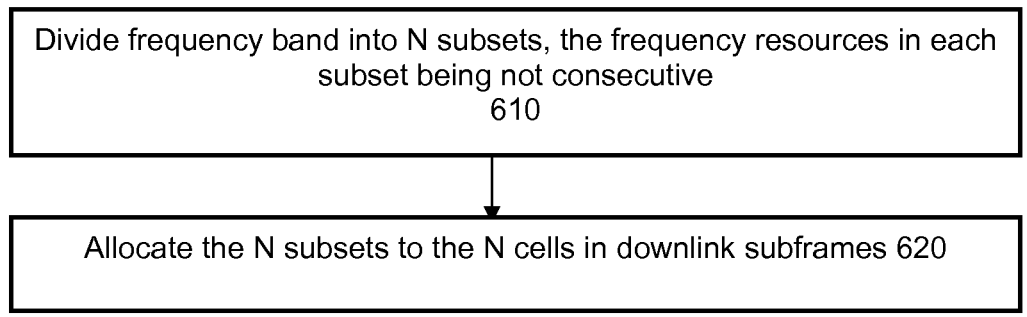
FIG. 6 illustratively shows a method of resource scheduling 600 in a wireless communication network in accordance with an embodiment of the invention.

FIG. 6 illustratively shows a method of resource scheduling 600 in a wireless communication network in accordance with an embodiment of the invention.

The network comprises N neighbouring cells indexed by i which share the same frequency band, where i=0, . . . , N−1, N>=3. At step 610, available frequency resources of the frequency band are divided into N subsets indexed by j, where j=0, . . . , N−1, wherein the frequency resources in each of the subsets are not consecutive. At step 620, the N subsets are allocated to the N cells in downlink subframes of a frame. The subsets allocated to each of the cells may vary among downlink subframes indexed by k, where k=0, . . . , K−1, K being the number of downlink subframes in the frame. The frequency resources in each of the subsets may comprise evenly distributed discrete RBGs. The N subsets may be allocated based on the PCI values of the N cells. The PCI values of the N cells mod N are equal to 0, 1, . . . , N−1 respectively, and when allocating the N subsets, the index j of the subset to be allocated to the ith cell in the kth downlink subframe may be obtained by j=(PCI value of the ith cell+k) mod N. The method 600 may be applied to FDD or TDD wireless communication network. In case the N cells are configured in FDD mode, the frequency band shared by the N cells is a downlink frequency band, and the frame is a downlink frame. In this case, K indicates the number of all subframes in the downlink frame since all the subframes are downlink subframes. The uplink frequency band may be divided into N subbands indexed by l, where l=0, . . . , N−1, wherein the frequency resources in each of the subbands are consecutive. The subframe based subband hopping may be applied to the uplink frequency band. In this case, the N subbands may be allocated to the N cells in an uplink frame, wherein the subbands allocated to each of the cells vary among uplink subframes indexed by m, where m=0, . . . , M−1, M being the number of uplink subframes in the uplink frame. The index l of the subband to be allocated to the ith cell in the mth uplink subframe may be obtained by l=(PCI value of the ith cell+m) mod N. In case the N cells are configured in TDD mode, the frame includes both uplink subframes and downlink subframes. In this case, K indicates the number of all the downlink subframes in the frame. For example, in the example as listed in Table 1, the number of downlink subframes in the frame is 6. The available frequency band may be into N subbands indexed by l, where l=0, . . . , N−1, wherein the frequency resources in each of the subbands are consecutive. The subframe based subband hopping may be applied to the uplink frequency band. In this case, the N subbands may be allocated to the N cells in the uplink subframes of the frame, and the subbands allocated to each of the cells vary among uplink subframes indexed by p, where p=0, . . . , P−1, P being the number of uplink subframes in the frame. For example, in the example as listed in Table 1, the number of uplink subframes in the frame is 4. The index l of the subband to be allocated to the ith cell in the pth uplink subframe may be obtained by l=(PCI value of the ith cell+p) mod N. In case that the uplink-downlink subframe configurations in the three cells are not static, when applying the method, a subframe which is configured to be an uplink subframe for at least one of the cells will be taken as an uplink subframe. The method can be applied to the FSFR scenario, i.e. the downlink frequency band shared by the N cells is a part of the whole available bandwidth. The frequency resources in (N-R) subsets may be moved into the remaining R subsets, where R<N and R>=2 to avoid waste of bandwidth.

Figure 7:
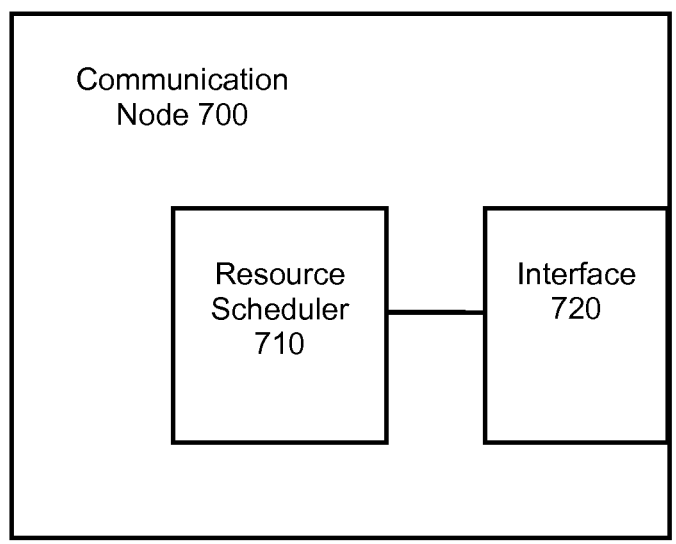
FIG. 7 is a block diagram of a communication node 700 for resource scheduling in a wireless communication network in accordance with an embodiment of the invention.

FIG. 7 is a block diagram of a communication node 700 for resource scheduling in a wireless communication network in accordance with an embodiment of the invention. For example, the communication node 700 may be an eNB in a LTE system. The network comprises N neighbouring cells indexed by i which share the same downlink frequency band, where i=0, . . . , N−1, N>=3. The communication node 700 comprises a resource scheduler 710 and an interface 720. The resource scheduler 710 is adapted to divide the available frequency resources of the downlink frequency band into N subsets indexed by j, where j=0, . . . , N−1, wherein the frequency resources in each of the subsets are not consecutive, and allocate the N subsets to the N cells in downlink subframes of a frame. The interface 720, e.g. a transceiver, is adapted to inform the N cells of the allocation. The subsets allocated to each of the cells may vary among downlink subframes indexed by k, where k=0, . . . , K−1, K being the number of downlink subframes in the frame. The frequency resources in each of the subsets may comprise evenly distributed discrete RBGs. The resource scheduler 710 may be adapted to obtain the index j of the subset to be allocated to the ith cell in the kth downlink subframe by j=(PCI value of the ith cell+k) mod N, wherein the PCI values of the N cells mod N are equal to 0, 1, . . . , N−1 respectively. In case the N cells are configured in FDD mode, the frequency band shared by the N cells is a downlink frequency band, and the frame is a downlink frame. The resource scheduler 710 may be further adapted to divide the available uplink frequency band into N subbands indexed by l, where l=0, . . . , N−1, wherein the frequency resources in each of the subbands are consecutive, and allocate the N subbands to the N cells in an uplink frame, wherein the subbands allocated to each of the cells vary among uplink subframes indexed by m, where m=0, . . . , M−1, M being the number of uplink subframes in the uplink frame. The resource scheduler 710 may be further adapted to obtain the index l of the subband to be allocated to the ith cell in the mth uplink subframe by l=(PCI value of the ith cell+m) mod N. In case the N cells are configured in TDD mode, the frame includes both uplink subframes and downlink subframes. The resource scheduler 710 may be further adapted to divide the available frequency band into N subbands indexed by l, where l=0, . . . , N−1, wherein the frequency resources in each of the subbands are consecutive, and allocate the N subbands to the N cells in the uplink subframes of the frame, wherein the subbands allocated to each of the cells vary among uplink subframes indexed by p, where p=0, . . . , P−1, P being the number of uplink subframes in the frame. The resource scheduler 710 may be further adapted to obtain the index l of the subband to be allocated to the ith cell in the pth uplink subframe by l=(PCI value of the ith cell+p) mod N. The resource scheduler 710 may be further adapted to take a subframe which is configured to be an uplink subframe for at least one of the cells as an uplink subframe. The downlink frequency band shared by the N cells may be a part of the whole available bandwidth, and the resource scheduler 710 may be further adapted to move the frequency resources in (N−R) subsets into the remaining R subsets, where R<N and R>=2.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention not be limited to the particular embodiment disclosed as the best mode contemplated for carrying out the present invention, but that the present invention include all embodiments falling within the scope of the appended claims.

What is claimed is:

1. A method of resource scheduling in a wireless communication network, the network comprising N neighbouring cells indexed by i which share the same frequency band, where i=0, . . . , N−1, and N>=3, the method comprising:
   dividing the available frequency resources of the frequency band into N subsets indexed by j, where j=0, . . . , N−1, wherein the frequency resources in each of the subsets are not consecutive and wherein each available frequency resource is assigned to only one of the N subsets; and
   for each downlink subframe of a frame, allocating each of the N subsets to a respective one of the N cells, such that each available frequency resource is allocated to only one of the N cells, for the downlink subframe,
   wherein Physical Cell ID (PCI) values of the N cells mod N are equal to 0, 1, . . . , N−1 respectively, and
   wherein said allocating the N subsets comprises obtaining the index j of the subset to be allocated to the ith cell in the kth downlink subframe by j=(PCI value of the ith cell+k) mod N.

2. The method of claim 1, wherein the subsets allocated to each of the cells vary among downlink subframes indexed by k, where k=0, . . . , K−1, K being the number of downlink subframes in the frame.

3. The method of claim 1, wherein the frequency resources in each of the subsets comprise evenly distributed discrete resource block groups.

4. The method of claim 1, wherein the N cells are configured in Frequency Division Duplexing (FDD) mode, the frequency band shared by the N cells is a downlink frequency band, and the frame is a downlink frame.

5. The method of claim 4, further comprising:
   dividing the available uplink frequency band into N subbands indexed by l, where l=0, . . . , N−1, wherein the frequency resources in each of the subbands are consecutive; and
   allocating the N subbands to the N cells in an uplink frame, wherein the subbands allocated to each of the cells vary among uplink subframes indexed by m, where m=0, . . . , M−1, M being the number of uplink subframes in the uplink frame,
   wherein said allocating the N subbands comprises obtaining the index l of the subband to be allocated to the ith cell in the mth uplink subframe by l=(PCI value of the ith cell+m) mod N.

6. The method of claim 1, wherein the N cells are configured in Time Division Duplexing (TDD) mode, and the frame includes both uplink subframes and downlink subframes.

7. The method of claim 6, further comprising:
   dividing the available frequency band into N subbands indexed by l, where l=0, . . . , N−1, wherein the frequency resources in each of the subbands are consecutive; and
   allocating the N subbands to the N cells in the uplink subframes of the frame, wherein the subbands allocated to each of the cells vary among uplink subframes indexed by p, where p=0, . . . , P−1, P being the number of uplink subframes in the frame,
   wherein said allocating the N subbands comprises obtaining the index l of the subband to be allocated to the ith cell in the pth uplink subframe by l=(PCI value of the ith cell+p) mod N.

8. The method of claim 7, wherein said allocating the N subsets and said allocating the N subbands comprise taking a subframe which is configured to be an uplink subframe for at least one of the cells as an uplink subframe.

9. The method of claim 1, wherein the downlink frequency band shared by the N cells is a part of the whole available bandwidth.

10. The method of claim 9, further comprising moving the frequency resources in (N-R) subsets into the remaining R subsets, where R<N and R>=2.

11. A communication node for resource scheduling in a wireless communication network, the network comprising N neighbouring cells indexed by i which share the same downlink frequency band, where i=0, . . . , N−1, N>=3, the communication node comprising:
   a resource scheduler configured to:
      divide the available frequency resources of the downlink frequency band into N subsets indexed by j, where j=0, . . . , N−1, wherein the frequency resources in each of the subsets are not consecutive and wherein each available frequency resource is assigned to only one of the N subsets; and,
      for each downlink subframe of a frame, allocate each of the N subsets to a respective one the N cells, such that each available frequency resource is allocated to only one of the N cells, for the downlink subframe; and
   an interface circuit configured to inform the N cells of the allocation,
   wherein Physical Cell ID (PCI) values of the N cells mod N are equal to 0, 1, . . . , N−1 respectively, and
   wherein the resource scheduler is configured to obtain the index j of the subset to be allocated to the ith cell in the kth downlink subframe by j=(PCI value of the ith cell+k) mod N.

12. The communication node of claim 11, wherein the resource scheduler is configured to allocate the N subsets so that the subsets allocated to each of the N cells vary among downlink subframes indexed by k, where k=0, . . . , K−1, K being the number of downlink subframes in the frame.

13. The communication node of claim 11, wherein the resource scheduler is configured to divide the available frequency resources so that the frequency resources in each of the subsets comprise evenly distributed discrete resource block groups.

14. The communication node of claim 11, wherein the N cells are configured in Frequency Division Duplexing (FDD) mode, the frequency band shared by the N cells is a downlink frequency band, and the frame is a downlink frame.

15. The communication node of claim 14, wherein the resource scheduler is further configured to:
   divide the available uplink frequency band into N subbands indexed by l, where l=0, . . . , N−1, wherein the frequency resources in each of the subbands are consecutive; and
   allocate the N subbands to the N cells in an uplink frame, wherein the subbands allocated to each of the cells vary among uplink subframes indexed by m, where m=0, . . . , M−1, M being the number of uplink subframes in the uplink frame,
   wherein the resource scheduler is further configured to obtain the index l of the subband to be allocated to the ith cell in the mth uplink subframe by l=(PCI value of the ith cell+m) mod N.

16. The communication node of claim 11, wherein the N cells are configured in Time Division Duplexing (TDD) mode, and the frame includes both uplink subframes and downlink subframes.

17. The communication node of claim 16, wherein the resource scheduler is further configured to:
   divide the available frequency band into N subbands indexed by l, where l=0, . . . , N−1, wherein the frequency resources in each of the subbands are consecutive; and
   allocate the N subbands to the N cells in the uplink subframes of the frame, wherein the subbands allocated to each of the cells vary among uplink subframes indexed by p, where p=0, . . . , P−1, P being the number of uplink subframes in the frame,
   wherein the resource scheduler is further configured to obtain the index l of the subband to be allocated to the ith cell in the pth uplink subframe by l=(PCI value of the ith cell+p) mod N.

18. The communication node of claim 11, wherein the downlink frequency band shared by the N cells is a part of the whole available bandwidth.

\* \* \* \* \*